United States Patent [19]

Sweeny

[11] Patent Number: 4,790,390
[45] Date of Patent: Dec. 13, 1988

[54] VALVELESS DOWN-THE-HOLE DRILL

[75] Inventor: Peter J. Sweeny, Limerick, Ireland

[73] Assignee: Minroc Technical Promotions Ltd., Smithstown, Ireland

[21] Appl. No.: 147,704

[22] Filed: Jan. 25, 1988

[30] Foreign Application Priority Data

Jan. 26, 1987 [IE] Ireland ................................. 191/87
Dec. 1, 1987 [IE] Ireland ................................. 3263/87

[51] Int. Cl.⁴ .............................................. B23Q 5/033
[52] U.S. Cl. ........................................ 173/17; 173/73; 173/119; 173/139
[58] Field of Search ............................. 173/13, 15–17, 173/73, 78, 119, 139; 91/234, 299, 325

[56] References Cited

U.S. PATENT DOCUMENTS

| | | | |
|---|---|---|---|
| 2,859,733 | 11/1958 | Bassinger | 121/30 |
| 3,958,645 | 5/1976 | Curington | 173/17 |
| 4,030,554 | 6/1977 | Kammerer, Jr. et al. | 173/17 |
| 4,084,646 | 4/1978 | Kurt | 173/17 |

Primary Examiner—Frank T. Yost
Assistant Examiner—James L. Wolfe
Attorney, Agent, or Firm—Kenyon & Kenyon

[57] ABSTRACT

A valveless down-the-hole hammer drill is actuated by fluid such as compressed air. The drill includes a piston disposed within a chamber defined within an outer wear sleeve, an air diverter at one end and a suspendably mounted drill bit at the other end, wherein the piston has a slidable contact surface with the chamber towards each end of the piston, such that the piston is slidably reciprocable within the chamber. Porting and exhaust arrangements alternately supply and exhaust live pressure fluid to either end surface of the piston to reciprocate it and cause it to repeatedly strike the drill bit. An intermediate compression chamber is defined between the two sliding contact surfaces of the piston between the piston and the outer wear sleeve. Air trapped in the intermediate chamber is compressed so as to apply a retarding force on the piston towards the end of the return stroke, and to provide additional impetus to the piston on the commencement of the drive stroke. Sealing arrangements to reduce air leakage past working clearance gaps are also disclosed.

10 Claims, 1 Drawing Sheet

VALVELESS DOWN-THE-HOLE DRILL

FIELD OF THE INVENTION

The present invention relates to an improved rock drill, in particular to an improved valveless down-the-hole (DTH) hammer drill actuated by a fluid such as compressed air.

BACKGROUND OF THE INVENTION

In a typical "valveless" DTH drill, the passage of compressed air through the drill assembly reciprocates a piston which repeatedly strikes a bit, wherein pressure air is alternately supplied to either side of the piston by a porting arrangement defined by air passageways in an internal sleeve in the cylinder, without the use of a moving valve such as a flapper valve. Pressure air is exhausted through a central bore in the piston and bit to the bore hole being drilled, which carries debris to the surface in an annular cavity surrounding the drill string. The central bore must be closed to allow the return stroke of the piston to commence, for example by means of a short tube or "footvalve" secured to the innermost end of the bit extending from the bit into the central bore of the piston, so that when the piston approaches the striking face of the bit on the downstroke the tube penetrates the central bore of the piston to seal the central bore.

U.S. Pat. No. 4,084,646 describes a high output valveless DTH drill, in which the high output performance is achieved by maintaining a continuous supply of live pressure fluid on rearwardly-facing surfaces defined between the ends of the piston by shoulders joining a smaller diameter portion of the piston with a larger diameter portion, thereby providing a constant driving force on the piston in the direction of the bit throughout the operating cycle. This constant force supplements the cyclic force applied to the rear end pressure surface, or crown, of the piston when the rear chamber is pressurised, so that the average force against the piston on its drive stroke is higher than previously known drills which only exhaust pressure fluid during the latter phase of the drive stroke. The piston is designed to have a circumferential "sealing" surface with the cylinder sleeve at its rear end adjacent to the crown, and with the cylinder casing or wear sleeve at its front end as defined by the circumference of a "clubhead" portion, so that a single chamber is defined between the cylinder sleeve, the cylinder casing and the reduced diameter portions of the piston between the two circumferential "sealing" surfaces. During operation, this chamber is constantly in fluid communication with the pressure fluid source, that is, it forms a reservoir of live pressure fluid. This can either enter a chamber rearwardly of the crown of the piston or a chamber forwardly of the striking or hammer surface of the piston, so as to reciprocate the piston within the cylinder, but will always exert a force upon the rearwardly facing shoulders o the piston.

In the efforts to attain better output performance, higher penetration rates and greater depth of penetration in difficult drilling conditions, there has been a tendency towards higher applied pressure, but workers skilled in the art have not recognised the full significance of the loss of effective working pressure through leakage past the very small gaps necessary for a sliding fit clearance between parts of the drill.

The valveless DTH drill cycle described in U.S. Pat. No. 4,084,646 will be generally effective at relatively low pressure (100 psi to 250 psi) operation and in the absence of any significant leakage of pressure fluid which can occur (a) between the head of the piston and the cylinder casing or wear sleeve, and (b) between the shank of the bit and the bit-retaining bearing. However, in DTH drills constructed with normal running clearances of typically 0.003–0.006 inches (0.07–0.15 mm) between the piston and cylinder and where the applied pressure is relatively high (above 250 psi) tests have shown that leakage past the head of the piston is of such a magnitude as to cause a substantial drain on the pressure fluid supply and so reduce the effective working pressure of the piston. The pressure fluid which may leak past the piston also has the effect of charging the exhaust passages with an excess of pressure fluid, which further reduces the performance of the hammer drill. The clearance between the bit-retaining bearing and the shank of the bit is typically 0.014–0.019 inches (0.25–0.45 mm) which appears to be such as to cause a very substantial amount of leakage of pressure fluid from the chamber forward of the striking surface of the piston. This reduces the lifting force on the piston at the beginning of the return stroke so as to shorten the stroke and thereby reduce the blow energy of the piston on its drive stroke.

It is an object of the present invention to provide a high performance valveless DTH hammer drill operating with a cycle which provides additional impetus to the piston on its drive stroke without continuously supplying live pressure fluid to the piston, such that loss of working pressure by leakage through clearance gaps is kept to a minimum. It is also an object of the invention to provide better sealing arrangements in a valveless DTH hammer drill adapted to operate at high pressure, i.e above 250 psi.

SUMMARY OF THE INVENTION

The present invention provides a valveless percussive down-the-hole drill actuated by a supply of pressure fluid, comprising
- an outer wear sleeve,
- a backhead assembly secured to one end of the outer wear sleeve connectable to a drill string and to a supply of pressure fluid, through the drill string,
- a pressure fluid diverter located within the outer wear sleeve adjacent to the backhead,
- a drill bit suspendably supported in bit retaining means secured to the other end of the outer wear sleeve,
- an inner sleeve located inside the outer wear sleeve towards the said one end thereof adjacent to the pressure fluid diverter, defining a fluid passageway between the inner sleeve and the outer wear sleeve allowing fluid communication between the pressure fluid diverter and a chamber so defined within the outer wear sleeve and between the diverter at one end and the drill bit at the other end,
- a piston disposed within said chamber having a first slidable contact surface with the chamber towards one end of the piston and a second slidable contact surface with the chamber towards the other end of the piston so as to be slidably reciprocable within the said chamber,
- a porting means associated with the inner sleeve and the piston for alternately directing live pressure fluid from the said fluid passageway to either end surface of the piston so as to reciprocate the piston and to cause it to repeatedly strike the drill bit, an exhaust means operably associated with the porting means for alternately exhausting pressure fluid supplied to either side of the piston to the drill exterior and a means for trapping a volume of pressure fluid in a space defined intermediate said first and second sliding contact surfaces of the piston between the piston and the outer wear sleeve, such that when said volume is compressed during rearward motion of the piston the trapped pressure fluid firstly exerts a retarding force against the rearward motion of the piston and then exerts an additional driving force at the commencement of forward motion.

The porting means preferably comprises twin ports defined in the inner sleeve, cooperable with first and second spaced apart groove means defined by the piston whereby the twin ports each in their turn alternately allows fluid communication between the said fluid passageway and the said chamber to one or the other end of the piston. Most preferably, such fluid communication is principally via the first groove means.

The means for trapping pressure fluid preferably comprises the second groove means on the piston.

The first and second groove means may each be defined by a series of radially-spaced axially-disposed slots on the piston, or each by a circumferential groove on the piston.

Advantageously, the fluid trapping means is also adapted, towards the end of the drive stroke of the piston in the interval when pressure fluid from the previous return stroke is being exhausted at the rearward end of the piston to release trapped pressure fluid to the front end of the piston to decelerate the piston to a certain extent before it strikes the bit.

Fluid seal means are preferably provided across one or more of the following working clearance gaps, namely between (a) the pressure fluid diverter and the inner sleeve,
(b) the pressure fluid diverter and the piston,
(c) the inner sleeve and the piston,
(d) the outer wear sleeve and the piston,
(e) the bit and bit retaining means,
(f) the outer wear sleeve and bit retaining means, whereby live pressure fluid losses through leakage to the drill exterior are substantially reduced.

When fluid seal means are provided across the working clearance gaps associated with the piston, the fluid seal means preferably comprises a fluid seal ring located in a retaining groove on the piston.

The exhaust means may be defined by a bore through the piston communicating with the drill exterior through the bit, a stem portion of the backhead adapted to mate with the rearward end of the piston bore, and a short tube projecting from the bit and adapted to mate with the forward end of the piston bore, such that pressure fluid supplied to either end of the piston is alternately exhausted to the drill exterior via the piston bore, wherein the short tube is of resilient material and includes a portion of slightly larger diameter than the bore diameter serving as an additional fluid seal.

DETAILED DESCRIPTION

Figure 1:
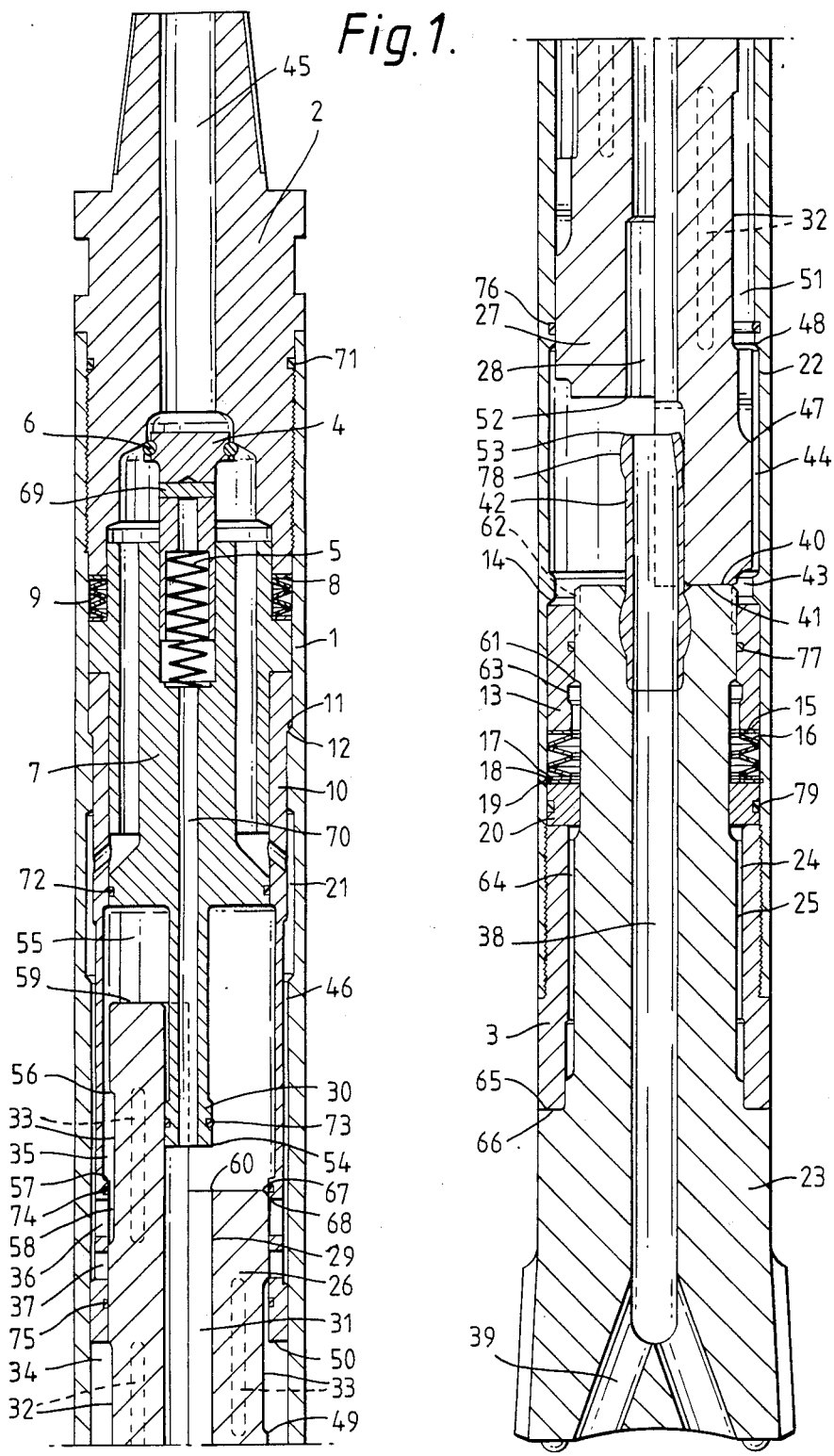
FIG. 1 is a sectional side-elevation of a rock drill according to the invention, split in two halves for ease of presentation, and depicting the piston nearing the end of the return stroke to the left of the section, and at the end of the drive stroke to the right of the section.

FIG. 1 shows a valveless down-the-hole rock drill actuated by compressed air comprising an outer wear sleeve 1 secured at one end to a backhead 2 and at the opposite end to a chuck 3. Located within the wear sleeve 1 at the end towards the backhead 2 is a check valve assembly in sealing engagement with the backhead 2. The check valve assembly comprises check valve 4, check valve spring 5, seal 6. Optionally, a removable plug 69 may also be provided in the check valve 4 to block an excess pressure relief vent passageway 70.

Interposed between the backhead 2 and an air diverter 7, are a wear spacer 8, and a set of disc springs 9 which act as shock absorber. An inner sleeve 10 is mounted on the air diverter 7 and extends into the wear sleeve 1. The inner sleeve 10 is located in the wear sleeve 1 by shoulder 11 on the inner sleeve contacting shoulder 12 on the wear sleeve 1. A bearing 13 is located within the wear sleeve 1 at the end towards the chuck 3, and is held in position by shoulder 14 on the wear sleeve, a compression washer 15, disc springs 16, washer 17, and retaining washer 18 located in a wear sleeve groove 19.

The inner diameter of the wear sleeve is machined to provide circumferential grooves 21 and 22.

A drill bit 23 is suspendably mounted on the chuck 3 and is held in place by a bit retaining ring 20 and bearing 13. The outer surface of the drill bit and the inner surface of the chuck are correspondingly splined as indicated at 24, the splines being so dimensioned as to provide a number of air passageways 25 around the drill bit 23 whose purpose will be described below.

A piston 26 is disposed partially within the inner sleeve 10 and partially within the the wear sleeve 1, having an axial bore 31 and at its forward end an enlarged striking head or "clubhead" 27 with an enlarged bore diameter 28. At the rearward end of the piston the top 29 of bore 31 is a sliding fit over a stem 30 on the air diverter 7.

The piston 26 has two series of radially-spaced axially-disposed slot 32, 33 machined on the outside of the piston which form respectively, air passageways 34, 35, wherein the slots 32,33 selectively communicate with ports 36,37 through the wall of the inner sleeve 10. Alternatively, the slots 32,33 may each be replaced by a continuous circumferentially- disposed groove in the piston. The drill bit 23 defines an axial bore 38, which at its front end is provided with angled exhaust passageways 39.

Normal operating cycle

At the commencement of operations, and with the piston 26 at its position of rest (as indicated to the right of the section of FIG. 1), the piston striking face 40 is in contact with contact face 41 of the drill bit 23. Here, the piston 26, the bearing 13, the bit 23, footvalve 42 and the wear sleeve 1 define a chamber 43 into which the passageway 44 around the piston 26 emerges, while at the top end the slots 33 in the piston are in register with the port 37 in the inner sleeve 10. On the admission of live pressure air through passageway 45, air passes through the check valve 4 and air diverter 7 into the annular gap 21, through groove 46 from where it passes through the port 37 and down between the slots 33 and groove 22 to pressurize the chamber 43 and thereby apply a rearward force on the piston which accelerates the piston to the rear. The rearward movement continues with live pressurized fluid in chamber 43 acting on the surface 40 of the piston 26. When the edge 47 of the piston head coincides with edge 48 of the wear sleeve groove 22 the flow of pressurized air to chamber 43 ceases. The piston 26 will continue to move to the rear due to the expanding pressure air remaining in chamber 43. When point 49 of the piston slots 33 reaches point 50 at the front end of the inner sleeve 10, live pressure air is cut off from chamber 51 formed by piston head 27, inner sleeve 10 and wear sleeve 1.

As soon as live pressure air is cut off from chamber 51, the air in chamber 51 is trapped and then compressed as the piston continues its rearward motion. This compression is considerably assisted by the sealing arrangements described below. Thus a retarding force is applied to the piston towards the end of the return stroke, and an additional impetus will be given in the manner of a compression spring at the commencement of the drive stroke, as the compressed air starts to expand.

When the front edge 52 of the bottom 28 of the piston bore passes the top edge 53 of the footvalve 42 the pressurized air in chamber 43 may now exhaust through axial bore 38 of the bit 23 and then through the angled exhaust passageways 39 of the bit 23. The footvalve 42 preferably includes a portion 78 of slightly larger diameter than the inside diameter of bore 28 serving as a fluid seal. The footvalve is made of a resilient material such as nylon.

Meanwhile at the other end, point 54 of the diverter stem 30 has entered into the top 29 of the bore 31 of the piston, sealing the chamber 55 defined by piston 26, inner sleeve 10, diverter 7 and diverter stem 30. When point 56 of the piston 26 reaches point 57 on the inner sleeve 10 live pressure air passes from port 36 through passage 58 formed between piston slots 33 and inner sleeve 10 and enters into chamber 55. This pressurized air applies a forward force on surface 59 of the piston 26 and arrests the rearward movement of the piston.

When the piston comes to a stop the force continues to act on surface 59 and drives the piston in the forward direction to commence the drive stroke. When point 56 on the piston 26 coincides with point 57 on the inner sleeve, live pressure air is cut off from chamber 55. As described above, during this interval the trapped air in chamber 55 continues to expand and to drive the piston forward with additional impetus until point 54 on the diverter stem 30 is clear of point 60 of the top 29 of the piston bore 31 at which time the pressurized air in chamber 55 is released and exhausts through the bore 31. The exhausting air passes directly into the bore 38 of the bit which has already been sealed by the front 28 of the piston bore 31 covering the footvalve 42. The exhausted air passes through the bit as previously described.

The piston continues to move forward and when point 47 of the piston head 27 coincides with point 48 of the wear sleeve groove 22 pressure air which has been trapped in chamber 51 is admitted to chamber 43 and applies a rearward force on to piston surface 40. This force is not sufficient to stop the piston which strikes the bit driving the bit forward. As the piston is stopped it is nevertheless acted upon by the cushioning force of air compressed in chamber 43 and by the recoil from the impact with the bit and so begins to move rearwardly to commence another cycle.

It will be appreciated that the chamber 51 is effectively an intermediate compression chamber, which during the cycle is sealed alternately from chambers 43 and 55, but when pressurized, applies an increasing retarding force contrary to the rearward motion of the piston towards the end of the return stroke and then assists the acceleration of the piston in a forward direction on commencement of the drive stroke. Correspondingly, but to a lesser degree, a retarding or cushioning force contrary to the forward motion of the piston is applied in a similar manner towards the end of the drive stroke and then assists the acceleration of the piston in a rearward direction at the commencement of the next return stroke. The sum of these forces result in improved rates of penetration during drilling operations by up to 10% in normal conditions.

Cycling of the piston continues as long as pressurized air is supplied through the drill stem and the bit is held within the hammer by the action of the external force supplied through the drill stem.

Interruption of normal cycle

When the forward feed on the drill stem is stopped, reversed, or the bit breaks into a cavity then the drill bit 23 will move forward in the chuck until the bit retaining ring 20 contacts shoulder 61 of the drill bit 23 at which point further forward movement of the bit is arrested. The piston can now travel forward compressing the air in chamber 43 which causes an increasing deceleration force on the piston. When flats 62 on the bit pass the groove 63 in the bearing 13 the pressurized air in chamber 43 is released through the air passageways 25 formed by the splines 24 of the bit and the internal splines 64 on the chuck, and through the gap that will have opened between surfaces 65 on the chuck and the shoulder 66 on the bit 23. The release of the pressure from chamber 43 is necessary to prevent the pressure air from accelerating the piston in the upward direction and so starting another cycle, since the drill is now "on blow".

At this time, point 67 on the piston rear face has cleared point 68 on the port 36 in the inner cylinder 10 and the pressure air escapes through the bore 30 in the piston, and through the bore 38 in the bit. The air pressure now acts solely to blow the drilled hole clear of debris. When the bit hits the bottom of the hole, it is pushed rearwardly to the position illustrated and cycling can recommence.

Improved sealing arrangements

In order to prevent or inhibit the leakage of pressure fluid through working clearance gaps the present invention also provides for improved sealing arrangements. In valveless DTH hammer drills currently in use, typical clearances would be as follows:

| Clearance | Gap (inches) | Equivalent orifice diameter for 6" o.d. drill (inches) |
|---|---|---|
| (a) Between piston and wear sleeve | 0.003–0.006 | 0.153–0.224 |
| (b) Between bit and bit-retaining bearing | 0.014–0.019 | 0.300–0.350 |

The problem of fluid leakage is most accentuated at the forward chamber 43. The working clearance defining a leakage path between the bit 26 and the bit-retaining bearing 13 is greater than the working clearance defining a leakage path between the piston 26 and the outer wear sleeve 1, so that the net leakage out of the chamber 43 is greater than the net leakage into the chamber 43 from the chamber 51. Thus, leakage from chamber 43 would continue consistently from chamber 43 while fluid pressure is applied, unless adequate sealing arrangements are provided. In fact, it can be calculated that as pressure fluid in the chamber 43 is still expanding during the return stroke, the amount of leakage occurring would be theoretically sufficient to discharge the chamber before the striking face 52 of the piston has cleared the footvalve 42, which normally marks the start of the exhaust phase of chamber 43.

It is therefore essential to provide adequate seals to prevent or inhibit leakage from the forward chamber 43. However, even when a seal is placed between bearing 13 and bit 23, the net effect of fluid leakage is a continuous loss of fluid up to 130 cfm with an applied pressure of 250 psi, @600 cfm, representing a net loss of about 20%, which would be even greater at higher applied pressures.

However, additional sealing of the clearance gap at the rearward end of the piston 26 with the inner sleeve 10 reduces pressure fluid losses from the rearward chamber 55 to the piston bore 31, and to the intermediate chamber 51, and further reduces fluid losses to a level of 60 cfm with an applied pressure of 250 psi @600 cfm, i.e. a net loss of 10%.

Fluid seals, for example made of rubber, nylon, other polymeric or elastomeric material, cast iron, brass, or other metal or alloy material, may be located in the drill in accordance with the following table, referring to FIG. 1:

| Seal | Gap to be sealed | Chamber to be sealed |
|---|---|---|
| 71 | Outer wear sleeve 1/backhead 2 | — |
| 72 | Inner sleeve 10/diverter 7 | Rear chamber 55 |
| 73 | piston 26/diverter stem 30 | |
| 74 | inner sleeve 10/piston 26 | |
| 75 | inner sleeve 10/piston 26 | Intermediate chamber 51 |
| 76 | outer wear sleeve 1/piston 26 | |
| 77 | bit 33/bearing 13 | Forward chamber 43 |
| 78 | piston 26/footvalve 42 | |
| 79 | outer wear sleeve 1/bit-retaining ring 20 | |

It will be apparent that seals 73–76 may be inserted either on the piston 26 or on the respective surfaces of the diverter stem 30, inner sleeve 10, or outer wear sleeve 1 with which the piston 26 is in sliding contact. It is most preferred to place fluid seal rings on the piston itself in locating grooves. Better seals will also be brought about by precision machining and reducing working clearance tolerances to an absolute minimum.

It has surprisingly been found in tests that the addition of seals as described above has led to an effective further increase in penetration rates of up to 15%, as compared to a drill without seals. It is clear that the substantially increased output efficiency of the drill in accordance with the present invention results from greater "blow energy" of the piston striking the bit, i.e. the piston is allowed to travel further in a rearward direction during the return stroke so as to impart a blow with greater force on the bit at the end of the drive stroke. The following factors are thought to be responsible for performance improvements over comparable prior art valveless DTH hammer drills:

the provision of intermediate chamber 51 which intermittently traps and compresses pressure fluid so as to apply additional retarding and driving forces to the piston respectively towards the end of the return stroke and on the commencement of the drive stroke, The provision of a combination of fluid seals to counteract pressure fluid losses through leakage past working clearance gaps, The absence of a continuous supply of live pressure fluid on the piston during the operating cycle, which tends to decrease the stroke by effectively retarding the rearward travel of the piston during the entire phase of the return stroke.

I claim:

1. A valveless percussive down-the-hole drill actuated by a supply of pressure fluid, comprising
   an outer wear sleeve,
   a backhead assembly secured to one end of the outer wear sleeve connectable to a drill string and to a supply of pressure fluid, through the drill string,
   a pressure fluid diverter located within the outer wear sleeve adjacent to the backhead,
   a drill bit suspendably supported in bit retaining means secured to the other end of the outer wear sleeve,
   an inner sleeve located inside the outer wear sleeve towards the said one end thereof adjacent to the pressure fluid diverter, defining a fluid passageway between the inner sleeve and the outer wear sleeve allowing fluid communication between the pressure fluid diverter and a chamber so defined within the outer wear sleeve and between the diverter at one end and the drill bit at the other end,
   a piston disposed within said chamber having a first slidable contact surface with a first chamber wall portion towards one end of the piston and a second slidable contact surface with a second chamber wall portion towards the other end of the piston so as to be slidably reciprocable within the said chamber,
   a porting means associated with the inner sleeve and the piston for alternately directing live pressure fluid from the said fluid passageway to either end surface of the piston so as to reciprocate the piston and to cause it to repeatedly strike the drill bit,
   an exhaust means operably associated with the porting means for alternately exhausting pressure fluid supplied to either side of the piston to the drill exterior and
   a means for trapping a volume of pressure fluid in a space defined intermediate said first and second sliding contact surfaces of the piston between the piston and the outer wear sleeve, such that when said volume is compressed during rearward motion of the piston the trapped pressure fluid firstly exerts a retarding force against the rearward motion of the piston and then exerts an additional driving force at the commencement of forward motion.

2. A drill as recited in claim 1, wherein the porting means comprises twin ports defined in the inner sleeve, cooperable with first and second spaced apart groove means defined by the piston whereby the twin ports each in their turn alternately allows fluid communication between the said fluid passageway and the said chamber to one or the other end of the piston.

3. A drill as recited in claim 2 wherein such fluid communication is principally via the first groove means.

4. A drill as recited in claim 3 wherein the means for trapping pressure fluid comprises the second groove means on the piston.

5. A drill as recited in claim 4 wherein the first and second groove means are each defined by a series of radially-spaced axially-disposed slots on the piston.

6. A drill as recited in claim 4 wherein the first and second groove means are each defined by a circumferential groove on the piston.

7. A drill as recited in claim 1 wherein the fluid trapping means is also adapted, towards the end of the drive stroke of the piston in the interval when pressure fluid from the previous return stroke is being exhausted at the rearward end of the piston, to release trapped pressure fluid to the front end of the piston to decelerate the piston to a certain extent before it strikes the bit.

8. A drill as recited in claim 1 including fluid seal means provided across a working clearance gap between at least one, of, (a) the pressure fluid diverter and the inner sleeve,
(b) the pressure fluid diverter and the piston,
(c) the inner sleeve and the piston,
(d) the outer wear sleeve and the piston,
(e) the bit and bit retaining means; and
(f) the outer wear sleeve and bit retaining means, whereby live pressure fluid losses through leakage to the drill exterior are substantially reduced.

9. A drill as recited in claim 8, such that when fluid seal means are provided across the working clearance gaps associated with the piston, the fluid seal means comprises a fluid seal ring located in a retaining groove on the piston.

10. A drill as recited in claim 8, wherein the exhaust means is defined by a bore through the piston communicating with the drill exterior through the bit, a stem portion of the backhead adapted to mate with the rearward end of the piston bore, and a short tube projecting from the bit and adapted to mate with the forward end of the piston bore, such that pressure fluid supplied to either end of the piston is alternately exhausted to the drill exterior via the piston bore, wherein the short tube is of resilient material and includes a portion of slightly larger diameter than the bore diameter serving as an additional fluid seal.

* * * * *

UNITED STATES PATENT AND TRADEMARK OFFICE
CERTIFICATE OF CORRECTION

PATENT NO. : 4,790,390

DATED : Dec. 13, 1988

INVENTOR(S) : PETER J. SWEENY

It is certified that error appears in the above-identified patent and that said Letters Patent is hereby corrected as shown below:

Column 1, line 59 "o" should be -- on --.
Column 4, line 45 "slot" should be -slots- Signed and Sealed this First Day of August, 1989

Attest:

DONALD J. QUIGG

Attesting Officer

Commissioner of Patents and Trademarks